United States Patent [19]
Harstad

[11] Patent Number: 5,402,821
[45] Date of Patent: Apr. 4, 1995

[54] IN-LINE INCREMENTALLY MANUALLY ADJUSTABLE ROTARY EXPANSION VALVE

[75] Inventor: Michael R. Harstad, Westby, Wis.

[73] Assignee: American Standard Inc., Piscataway, N.J.

[21] Appl. No.: 292,706

[22] Filed: Aug. 18, 1994

Related U.S. Application Data

[63] Continuation-in-part of Ser. No. 126,615, Sep. 24, 1993, abandoned.

[51] Int. Cl.⁶ .............................................. F25B 41/06
[52] U.S. Cl. ..................... 137/556; 62/528; 137/625.31; 138/46
[58] Field of Search .............. 137/625, 31, 556, 425.3; 62/528; 251/304; 138/46, 45

[56] References Cited

U.S. PATENT DOCUMENTS

| | | | |
|---|---|---|---|
| 506,991 | 10/1893 | Forstburg et al. | 62/528 X |
| 1,738,135 | 12/1929 | Bannister | 137/625.31 |
| 3,812,882 | 5/1974 | Taylor | 251/304 X |
| 4,532,961 | 8/1985 | Walton et al. | 137/625.31 |
| 4,612,783 | 9/1986 | Mertz | 62/528 |
| 5,016,673 | 5/1991 | Carter et al. | 138/46 X |

Primary Examiner—William E. Wayner
Attorney, Agent, or Firm—William J. Beres; William O'Driscoll; Peter D. Ferguson

[57] ABSTRACT

A variable flow rate expansion valve designed for in-line installation in a fluid conveying conduit such as between the high pressure condenser and lower pressure evaporator of a refrigeration system includes an integrally defined restrictor disc and a closure disc for controlling the flow of fluid through the valve. The restrictor disc has a first set of flow apertures and the closure disc a second set of flow apertures. The closure disc is rotatably coupled to the fixed restrictor device in a plane parallel to the plane of the restrictor disc and perpendicular to refrigerant flow. A manual, calibrated, incrementally adjustable actuator permits the positioning of the closure disc with respect to the restrictor disc so as to permit the flow of refrigerant through the valve to be manually adjusted, by a chnage in the registry of the apertures in the closure and restrictor discs, in accordance with varying operating conditions and requirements.

20 Claims, 3 Drawing Sheets

IN-LINE INCREMENTALLY MANUALLY ADJUSTABLE ROTARY EXPANSION VALVE

This continuation-in-part patent application derives from U.S. patent application Ser. No. 08/126,615, filed Sep. 24, 1993, now abandoned.

This patent application relates to a co-pending and co-owned patent application filed concurrently herewith entitled "In-Line Incrementally Adjustable Electronic Expansion Valve" and naming "David H. Eber" as inventor.

TECHNICAL FIELD

This invention pertains to expansion valves for use in refrigeration systems. More particularly, this invention relates to an in-line manually positionable refrigeration system expansion device that provides for incrementally adjustable refrigerant flow control between the high and the low pressure sides of a refrigeration system.

BACKGROUND OF THE INVENTION

Conventional refrigeration and air conditioning systems utilize a series of recirculating fluid loops to cool a space by transferring the heat from the space, through the fluid loops and ultimately, to a heat sink such as water or ambient outside air. A commercial air conditioning system, for instance, typically includes a water chiller having an evaporator at its low pressure side, a condenser at its high pressure side, a compressor to boost the pressure of refrigerant as it flows from the evaporator to the condenser and an expansion valve to meter refrigerant from the high pressure condenser to the low pressure evaporator.

In a first fluid loop, water passes through the chiller evaporator where it is cooled in a heat exchange relationship with relatively cooler system refrigerant before being directed to a location where it absorbs heat and is returned to the evaporator. In "flooded design" evaporators the water in the chilled water loop flows through the tubes of the evaporator and liquid refrigerant surrounds the outside of the tubes. The cooler liquid refrigerant surrounding the tubes absorbs heat energy from the relatively warmer water, thereby chilling the water.

The liquid refrigerant vaporizes during the removal of heat energy from the warm water in the evaporator. The vaporized refrigerant is pumped out of the evaporator by the compressor which compresses the gaseous refrigerant, raising both its pressure and temperature. The high temperature refrigerant gas then flows to the system condenser where its heat is rejected, most typically, to water in a second fluid loop or directly to ambient air.

As the refrigerant is cooled in the condenser it changes state from a hot gas to a warm, relatively high pressure liquid which is metered, through a pressure reducing expansion valve, to the evaporator. The expansion valve maintains the pressure differential between the high and low pressure sides of the refrigeration system.

The pressure of refrigerant is controllably reduced as it passes through the expansion valve to ensure that the refrigerant will effectively vaporize and absorb heat from the relatively warm water flowing through the evaporator. The cycle is completed, and ready to be repeated, when the liquid refrigerant flows at reduced pressure through the expansion valve back to the evaporator.

The amount of liquid refrigerant introduced into the evaporator should be that amount which can wet the surface area of the tubes of the evaporator without having more or less liquid refrigerant in the evaporator than is needed for a particular cooling load. Accordingly, the expansion valve should be adjustable to control the amount of liquid refrigerant introduced into the evaporator.

In many instances where the cooling load varies on a continuous or near continuous basis, electric, rotary actuated, incrementally adjustable, motor driven, electronically controlled expansion valves are used to continuously modulate the flow of refrigerant into the evaporator in accordance with the changing cooling loads. In other instances, however, the application in which a chiller is employed is such that the rate of refrigerant flow through the expansion valve typically need not change or requires adjustment only at relatively infrequent intervals due to the existence of a very even or near constant cooling load. In such instances, the more expensive, electric motor driven expansion valves, together with the controls necessary for the motor-driven positioning the valve components are not needed or justifiable and comprise an additional expense, complication and potential failure mode with respect to chiller operation.

It is an object of the present invention to provide a rotary, manually operable and adjustable expansion valve of relatively rugged, simple and inexpensive construction.

It is still another object of the present invention to provide a manually operable and durable rotary refrigerant expansion device which is compact so as to take up a minimum amount of space in the refrigerant piping in which it is disposed.

It is a still further object of the present invention to provide a rotary expansion device for a refrigeration system having the capability to permit for the manual adjustment of refrigerant flow through the device in order to meet the requirements of different operating conditions.

These and other objects of the present invention will be apparent from the attached drawings and the Description of the Preferred Embodiment which follows.

SUMMARY OF THE INVENTION

The present invention is a manually adjustable variable flow rate expansion valve for a refrigeration system. The valve has a housing which facilitates its in-line mounting in refrigerant piping. A fixed restrictor is preferably integrally formed within the valve housing which controls refrigerant flow through the valve and the refrigerant piping in which the valve is disposed.

First flow apertures are defined in the restrictor. A closure device, the purpose of which is to vary the degree of opening of flow apertures in the restrictor to flow, is rotatably coupled to the restrictor. Second flow apertures are defined in the closure device which is capable of being manually rotatably positioned between an open position, where its apertures are in full registry with the restrictor flow apertures, and a closed position, where it apertures are entirely out of registry with the restrictor flow apertures and where flow through the valve is shut off.

A manual actuator mechanism is operably coupled to the closure device such that the linear movement of the actuator causes rotation of the closure device so as to permit the selective positioning of the closure device and its flow apertures with respect to the apertures in the restrictor. The closure member rotates in a plane generally transverse to the flow of refrigerant therethrough and is biased away from the restrictor so that a leakage path is at all times maintained, even if the apertures of the closure device and restrictor are out of registry. This permits pressure equalization across the valve and in the refrigeration system in which it is employed subsequent to the shutdown of the refrigeration system.

The present invention is of relatively uncomplicated but unique design and is noteworthy for its lack of critical tolerances as between its component parts. The design provides for ease and reduced cost of manufacture as well as low maintenance and service, all in an economical valve which permits the flow of refrigerant to be adjusted when advantageous or necessary.

DESCRIPTION OF THE PREFERRED EMBODIMENT

Figure 1:
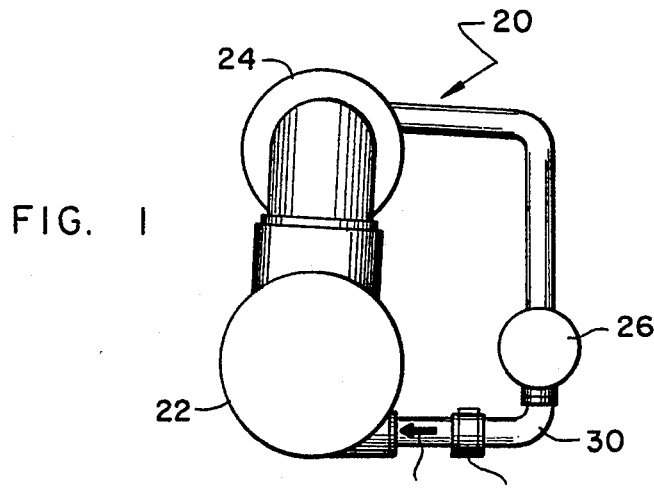
FIG. 1 is a schematic representation of a refrigeration chiller.

Referring first to FIG. 1, a refrigeration chiller 20 is schematically illustrated and consists of four primary components, evaporator 22, compressor 24, condenser 26 and expansion valve 28. Evaporator 22 conveys cool, liquid refrigerant into heat exchange contact with the water which is to be chilled by the chiller. As the refrigerant absorbs heat from the water in the evaporator, it vaporizes. The refrigerant vapor is drawn from the evaporator by compressor 24 which compresses it thereby raising both the temperature and pressure of the gas.

The hot, gaseous refrigerant is then pumped by compressor 24 to condenser 26 where it is cooled and condenses to a warm liquid. The liquid refrigerant, still at relatively high pressure, then flows to expansion valve 28.

Still referring to FIG. 1, expansion valve 28 causes a drop in pressure in the refrigerant as it passes from condenser 26 to evaporator 22. While a portion of the refrigerant flashes to vapor, the bulk of the refrigerant passing through the valve to the evaporator is in the liquid state.

The water which is to be chilled in evaporator 22 passes through the evaporator and is cooled by the relatively cool chiller system refrigerant. The chilled water is then circulated to the space or process with respect to which it is used while the now relatively warmer vaporized refrigerant flows to the compressor 24 for recompression in a continuous process.

Figure 3:
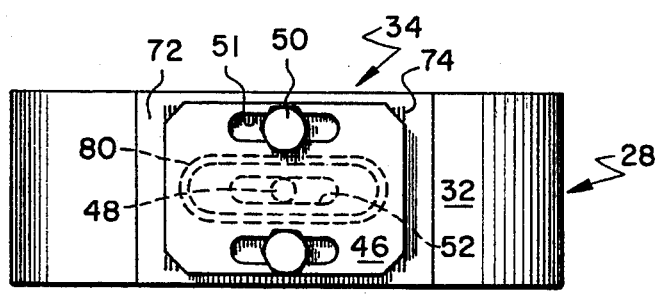
FIG. 3 is a view of the exterior of the valve of the present invention illustrating its manually adjustable actuator.
Figure 2:
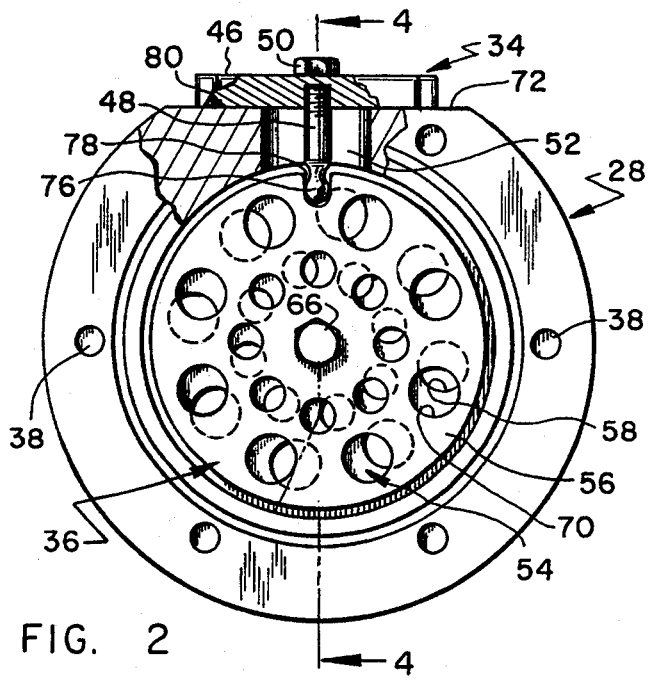
FIG. 2 is a partially broken away view of the expansion valve of the present invention illustrating the nature of its fixed and rotating members as well as the interaction of the manual adjustment mechanism with the rotating member.
Figure 4:
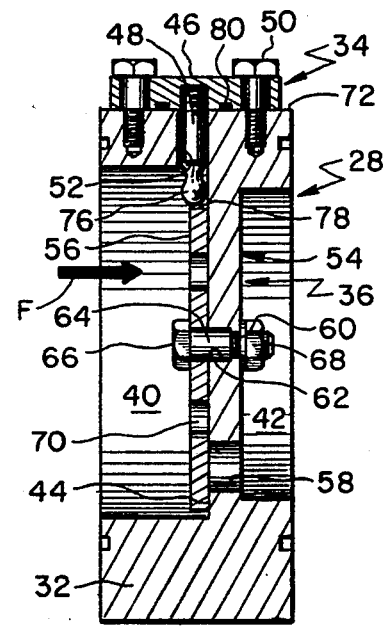
FIG. 4 is a sectional view taken along line 4—4 of FIG. 2.

Referring additionally now to FIGS. 2, 3 and 4, expansion valve 28 is disposed in pipe 30 which connects condenser 26 to evaporator 22. Refrigerant flow direction in pipe 30 and through valve 28 is indicated by arrows F in FIGS. 1 and 4.

Valve 28 acts as a boundary between the high and low pressure sides of chiller 20 and performs the function of delivering liquid refrigerant to evaporator 22 in precisely metered quantities. Valve 28 includes valve casing 32 and two main functional components, actuator 34 and metering section 36. Valve casing 32 is a structural member, typically cast or fabricated as a single unit, and has a plurality of mounting bores 38 located to align with similar bores in flanges in refrigerant piping 30 to permit the in-line installation of the valve in the refrigerant piping.

The inner portion of valve casing 32 defines an inlet recess 40 and an outlet recess 42. Inlet recess 40 and outlet recess 42 are in flow communication through the valve casing and cooperate in the definition of a fluid passageway through the valve and refrigerant piping. Preferably, inlet recess 40 is of greater diameter than outlet recess 42 so that a lip 44 is formed at the juncture of the inlet and outlet recesses.

Actuator 34 is comprised of sliding block 46, drive pin 48 and securing bolts 50. Bolts 50 project through slots 51 in sliding block 46 which restricts and defines the path of movement of block 46 with respect to the valve casing.

Pin 48, which is attached for movement with block 46, projects through elongated slot 52 in valve casing 32. As sliding block 46 is moved axially of elongated slot 52, pin 48 is correspondingly positioned within slot 52.

Fluid metering section 36 of valve 28 is comprised of two main portions, a fixed portion 54 and a rotating plate portion 56. As was earlier mentioned, fixed portion 54 is preferably integrally formed or fabricated in valve casing 32 and has a plurality of flow apertures 58 formed therein which restrict the flow of fluid through the valve.

In the embodiments of FIGS. 2, 3 and 4 flow apertures 58 are illustrated as being circular. The shape of flow apertures 58 in the valve of the present invention is not critical although the size of the apertures, in accordance with the application in which it is used, is. Fixed portion 54 of valve 28 defines a central bore 60 employed in the mounting of rotating plate portion 56 to the valve casing as will subsequently be described.

Rotating portion 56 of valve 28 is plate-like, preferably circular in shape and has a circumference which is slightly less than the circumference of inlet recess 40 but greater than the outermost edge of any aperture in fixed portion 52 of the valve. As such, when mounted to valve casing 32, rotating portion 56 is free to rotate within the inlet recess traverse to the flow of refrigerant therethrough. The circumference of rotating portion 56 is such that its radially outermost portion is in sliding engagement with lip 44 of the valve casing.

Rotating portion 56 of valve 28 defines a central bore 62 which provides for its rotational mounting to fixed portion 54 of the valve casing. A thrust bearing 64, having a central bore therethrough, is mounted in central aperture 60 of fixed valve portion 54. Bore 62 of rotating portion 56 is positioned in registry with the bore through bearing 64 and the combination of bolt 66, passing through the bore of bearing 64 and lock nut 68, rotatably secures rotating portion 56 to fixed portion 54 of the valve casing.

Rotating plate portion 56 of valve casing 32 defines a plurality of flow apertures 70 which are preferably of the same size, shape and distance from the axis of plate rotation as apertures 58 are in relation to the axis through the bore 60 of fixed portion 54. Accordingly, at a predetermined point of rotation, apertures 70 of rotating portion 56 are brought into full and coincidental registry with apertures 58 of fixed portion 54.

Figure 6:
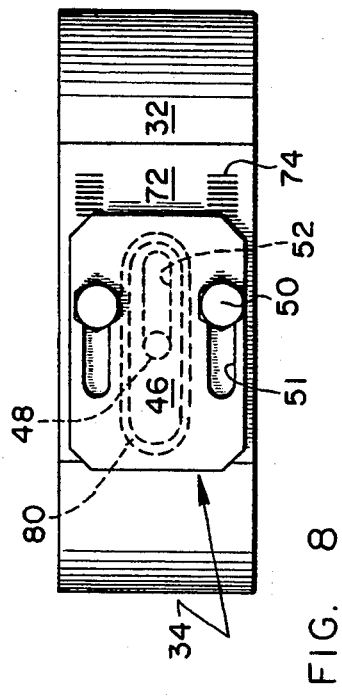
FIGS. 5 and 6 correspond respectively to FIGS. 2 and 3 showing the valve of the present invention in its fully opened position.
Figure 8:
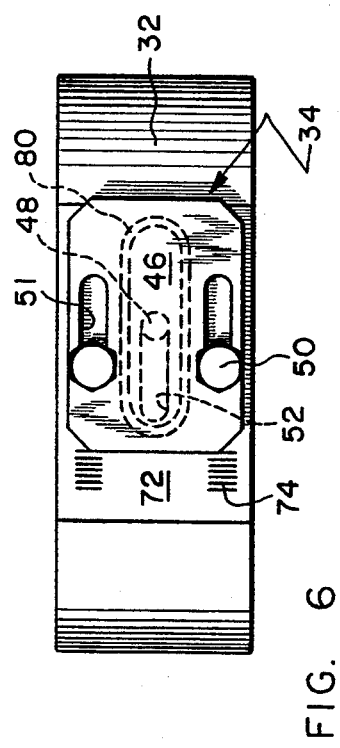
FIGS. 7 and 8 correspond to FIGS. 2 and 3 respectively showing the valve of the present invention in its fully closed position.

The relationship of apertures 58 of fixed portion 54, apertures 70 of rotating portion 56 and slot 52 and pin 48 of actuator 34 is such that slot 52 must be of sufficient length to permit the movement of pin 48 therewithin to an extent such that at one extreme of the traverse of pin 48 in slot 52, the apertures 58 and 70 of the fixed and rotating portions of the valve member are in full registry while at a second extreme of pin traverse, apertures 58 and 70 are entirely out of registry. Fixed apertures 58 are fully closed at the second extreme and fluid flow through valve 28 is prevented. The fully opened position of valve 28 is illustrated in FIGS. 5 and 6 while the fully closed position is illustrated in FIGS. 7 and 8.

In operation, valve 28 is installed in refrigerant piping 30 which conveys liquid refrigerant from condenser 26 to evaporator 22. The amount of refrigerant required by evaporator 22 is determined by the application in which chiller 20 is employed and the conditions under which the chiller is operating. With respect to the valve of the present invention, it is envisioned that the cooling load on the chiller is relatively constant so that the need to change the flow rate of refrigerant through valve 28 is infrequent.

Valve casing 32 has a generally planar portion 72 upon which sliding block 46 is positioned. Planar portion 72 of casing 32 is demarked with valve position markings 74 which, in accordance with the position of block 46 on planar surface 72 with respect to the markings, correspond with and are indicative of the degree to which valve 28 is open to flow. As will further be discussed, the position of block 46 on surface 72 is determinative of the rotational position of rotating plate portion 56 within the valve and the degree of registry of apertures 58 and 70 internal of the valve.

Figure 5:
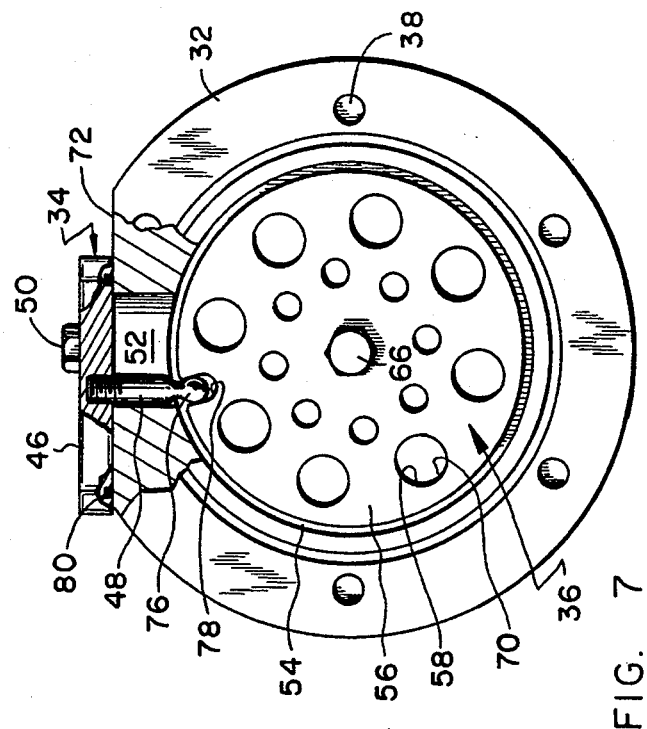
Figure 7:
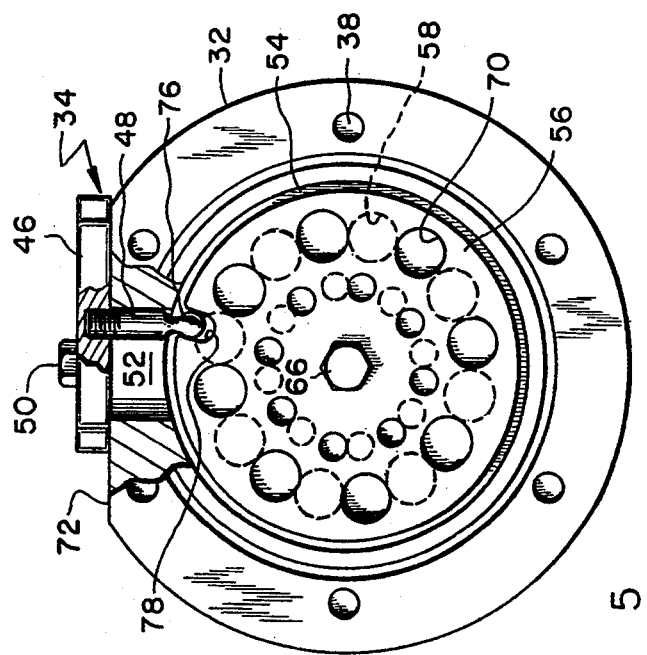

As will be apparent from Drawing FIGS. 2, 5 and 7, the position of sliding block 46 is determinative of the position of pin 48 within bore 52 of valve casing 32. Pin 48 has a head portion 76 which is accommodated in notch 78 defined in the outer periphery of rotating plate portion 56 of the valve. In a cam and follower type of arrangement, the movement of sliding block 46 causes the movement of pin 48 within elongated bore 52.

The movement of pin 48 and its head portion 76 exerts, in turn, a force on a surface of notch 78 which causes rotating plate 56 to rotate and be positioned in accordance with the location of sliding block 46 on planar surface 72. By the calibration of markings 74 on surface 72 to the position of pin 48 in slot 52 and the degree of registry of apertures 58 and 70 at various pin positions, an external viewing of valve 28, in accordance with the position of sliding block 46 with respect to markings 74, is indicative of the degree of registry of apertures 58 and 70 and therefore, the permitted flow rate through the valve.

Bolts 50, when tightened, secure the position of sliding block 46 on planar portion 72 of the valve casing, locking sliding block 46 in place and establishing the permitted flow rate through the valve. An elastomeric seal 80 is disposed between sliding block 46 and planar portion 72 of the valve casing to provide a seal therebetween.

In order to reposition rotating portion 56 of the valve so as to change the flow rate through the valve, bolts 50 are loosened sufficiently to permit the slideable movement of block 46 on planar portion 72. Block 46 is then repositioned, in accordance with markings 74, so as to change the degree of registry of apertures 58 and 70 to establish the new desired flow rate through the valve. Bolts 50 are then retightened and valve 28 will have been manually and very conveniently modulated or adjusted for optimum performance, all without having employed a motor or controls for such a motor.

Frictional forces caused by the impact of high pressure fluid refrigerant impinging on rotating portion 56 are borne by thrust bearing 64 and by the periphery of rotating portion 56 which is sliding engagement with lip 44. It is to be noted that other than elastomeric seal 80 between sliding block 46 and planar portion 72, valve 28 employs no discrete seal elements in its metering portion, such as between rotating plate portion 56 and the valve casing. Therefore, when expansion valve 28 is in closed position, there is the potential for a small but tolerable amount of leakage through the valve.

Figure 10:
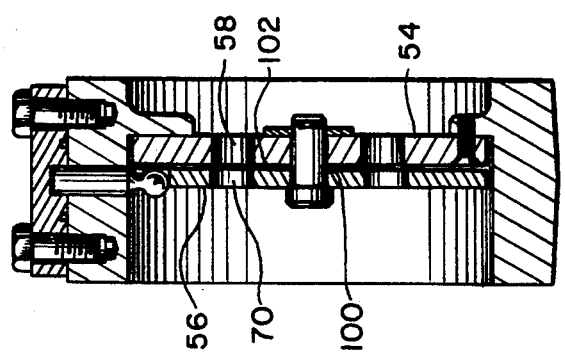
FIGS. 9, 10 and 11 illustrate the disposition of a biasing member between the closure member and restrictor portions of the present invention which ensures the existence of a leakage path through the valve of the present invention when the apertures of the closure member and restrictor device are out of registry.
Figure 11:
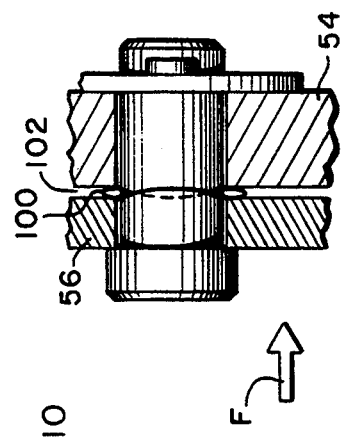
Figure 9:
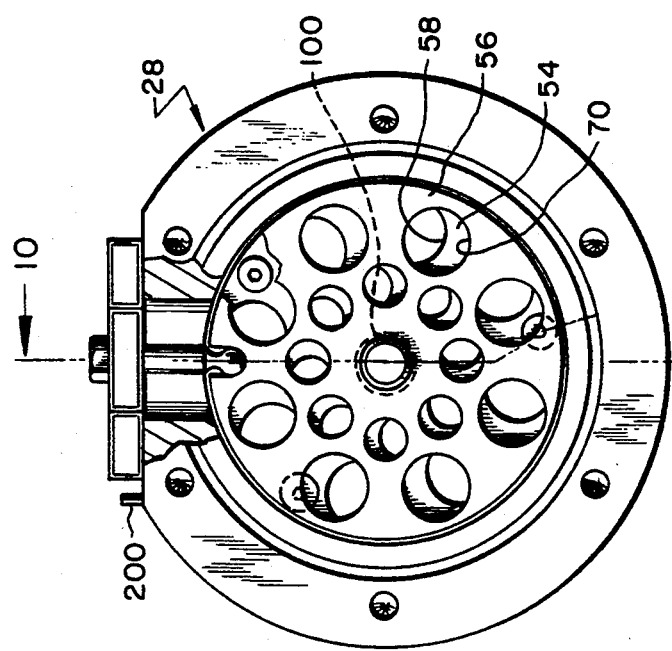

As is indicated above, in the embodiment of FIGS. 2-8 the downstream face of rotating portion 56 of valve 28 is in sliding engagement with the upstream face of fixed portion 54, including at the radially outermost portion of rotating portion 56 where rotating portion 56 slideably engages lip 44 of the valve casing. In that embodiment the force on rotating portion 56 caused by the impact of high pressure fluid refrigerant impinging on it are borne by thrust bearing 64. In the embodiment of FIGS. 9, 10 and 11, however, a spacer 100 is disposed between rotating member 56 and fixed portion 54 of valve 28.

As a result, rotating member 56, in this embodiment, is very slightly disengaged from slideable contact with fixed portion 54, by the creation of gap 102, so that even when apertures 58 and 70 of the fixed and rotating portions of the valve member are entirely out of registry, a leakage path is maintained around the periphery of rotating portion 56 and through apertures 70 into intervening gap 102 and thence through apertures 70 of fixed portion 54. This permits the pressure in the refrigeration system in which valve 28 is employed to equalize across the valve when the refrigeration system shuts down.

To the extent that valve 28, in its fully closed position where the apertures 58 and 70 are entirely out of registry, might prevent or slow pressure equalization within a refrigeration system in which it is employed, such as chiller 20 in FIG. 1, the potential for damage to the chiller when the system is next started might exist. By spacing rotating member 56 away from fixed portion 54 of valve 28 the existence of a leakage path through valve 28 across which system pressures can equalize when the apertures of the fixed and rotating portions of the valve are entirely out of registry is assured in a manner which does not appreciably affect the operation or accuracy of the valve with respect to its refrigerant flow modulating function. In that regard, when apertures 58 and 70 are in registry to any degree, the flow of refrigerant through valve 28 will essentially be through the apertures with little, if any, refrigerant flow occurring past and/or around the periphery of rotating member 56.

The use of a spacer 100 which, in addition to spacing member 56 from fixed portion 54, biases rotating member 56 away from fixed portion 54 will facilitate the rotation of member 56 against the impact of refrigerant flow on the upstream face of the rotating member. A Belleville spring or wavy washer is useful in that regard.

It is also to be noted that it may be advantageous in some circumstances or applications to ensure that the aperatures 58 and 70 are restricted from being placed into full registry. Referring to the earlier drawing figures, that restriction can be accomplished by inscribing gradations/markings 74 such that when the full open position is indicated, apertures 58 and 70 are still slightly out of register. Alternatively slot 51 in block 46 could be milled so as not to permit movement of block 46 to a point which puts the aperatures in full registry. Or, a mechanical stop, such as stop 200 can be formed or attached to the surface of valve 28 on which block 46 slides to prevent its being positioned such that apertures 58 and 70 come into registry.

While the present invention has been described in terms of a preferred embodiment, it will be appreciated that modifications and versions of the valve of the present invention will be apparent to those skilled in the art given the teachings herein. Accordingly, the scope of the present invention should not be limited other than in accordance with the language of the claims which follow.

What is claimed is:

1. A manually adjustable refrigerant expansion valve comprising:
    refrigerant metering means, including both a substantially planar rotating member and a fixed member, said rotating and said fixed members each defining a plurality of apertures, the degree to which said apertures of said rotating member are in registry with said apertures of said fixed member being determinative of the amount of refrigerant flow through said valve, said rotating member rotating in a plane substantially transverse to the flow of refrigerant therethrough and being spaced away from said fixed member so that a leakage path is formed which permits pressure equalization across said valve even when said apertures of said rotating member are out of registry with said apertures of said fixed member; and
    manually operable means, connected to said rotating member, for changing said degree of registry.

2. The expansion valve according to claim 1 further comprising a biasing member, said biasing member causing said rotating member to be spaced away from said fixed member.

3. The expansion valve according to claim 2 further comprising means, viewable exterior of said valve, indicative of said degree of registry.

4. The expansion valve according to claim 3 wherein said means for changing said degree of registry comprises an actuator operably connected to said rotating member such that the movement of said actuator causes said rotating member to rotate.

5. The expansion valve according to claim 3 wherein the peripheral edge of said rotating member is radially outermore than the outermost edge of any of said at least one aperture in said fixed member and wherein said rotating member is upstream of said fixed member with respect to the direction of refrigerant flow through said valve and further comprising means for prevent said apertures in said rotating member form coming into full registry with said apertures in said fixed member.

6. The expansion valve according to claim 4 wherein said apertures in said rotating member and said apertures in said fixed member are of the same size and shape so that when said apertures in said rotating member and said apertures in said fixed member are in registry, the peripheral edges thereof are coincidental with respect to the flow of refrigerant therethrough.

7. The expansion valve according to claim 6 wherein said rotating member is positionable such that all of said apertures in said rotating member are entirely out of registry with all of said apertures in said fixed member so that the flow of refrigerant through said valve is prevented other than through said leakage path.

8. The expansion valve according to claim 7 wherein said expansion valve includes a housing, said housing defining a slot and said rotating member being disposed in said housing, and wherein said actuator includes means, penetrating said housing through said slot, operably connected to said rotating member.

9. The expansion valve according to claim 8 wherein said actuator includes a member in slideable engagement with a surface of said housing, the position of said sliding member on said housing with respect to said indicating means indicating said degree of registry.

10. The expansion valve according to claim 9 further comprising means for providing a seal between said valve housing and said slideable member.

11. The expansion valve according to claim 10 further comprising means for releasably securing said slideable member to said valve housing.

12. A refrigerant expansion valve comprising:
    a housing, said housing defining a plurality of apertures;
    a plate mounted for rotary motion in said housing, generally perpendicular to the flow of refrigerant through said valve, said plate defining a plurality of apertures;
    actuator means, manually operable from the exterior of said housing, for causing the rotation of said plate, the degree of registry of said apertures in said plate with respect to said apertures in said housing being determinative of the amount of refrigerant flow through said valve; and
    a spacer, said spacer positioning said plate away from said housing to ensure the definition of a leakage path past said plate and through said housing even when said plurality of apertures of said housing and said plurality of apertures of said plate are out of registry.

13. The refrigerant expansion valve according to claim 12 wherein said spacer biases said plate away from said housing and wherein said actuator is linearly moveable, linear movement of said actuator being translate to rotary motion of said plate.

14. The refrigerant expansion valve according to claim 13 further comprising means for indicating said degree of registry.

15. The refrigerant expansion valve according to claim 13 further comprising means for preventing said apertures of said plate from coming into full registry with the apertures of said housing.

16. The refrigerant expansion valve according to claim 14 wherein said housing defines a slot-like opening, said actuator means including means extending through said opening into operable engagement with said plate.

17. The refrigerant expansion valve according to claim 16 wherein said means for indicating said degree of registry comprises means, viewable on the exterior of said housing, indicative, in accordance with the position of said actuator means, of the degree of registry of said plurality of apertures in said rotary member with said plurality of members in said housing.

18. The refrigerant expansion valve according to claim 17 wherein said apertures defined in said housing and said apertures defined in said plate are of the same size and of a disposition within said valve such that when said apertures of said housing and said plate are in registry, the peripheral edges thereof are coincident with respect to the direction of flow of refrigerant through said valve.

19. The refrigerant expansion valve according to claim 18 wherein said housing has a planar surface and said actuator means includes a portion releasably secured to said housing for movement along said planar surface of said housing.

20. The refrigerant expansion valve according to claim 18 wherein said means extending through said opening into operable engagement with said plate comprises an elongated pin-like member connected to said slideable portion of said actuator means, said pin-like member extending into an accommodating portion of said plate, movement of said slideable portion and said pin-like member cooperating to exert a force on said accommodating portion of said plate such that the movement of said slideable portion of said actuator means causes said plate to rotate, the position of said slideable portion of said actuator means on said planar surface being indicative of said degree of registry of said plurality of apertures in said plate with said plurality of apertures in said housing.

* * * * *